US007982173B2

(12) United States Patent
Schreiter et al.

(10) Patent No.: US 7,982,173 B2
(45) Date of Patent: Jul. 19, 2011

(54) OPTICAL VIEWING ARRANGEMENT, REMOTE-CONTROL UNIT AND VIEWING SYSTEM HAVING AN IMAGE RECORDING FUNCTION

(75) Inventors: Gerd Schreiter, Weilburg (DE); Kurt Becker, Wettenberg (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 332 days.

(21) Appl. No.: 11/882,775

(22) Filed: Aug. 6, 2007

(65) Prior Publication Data
US 2008/0036912 A1    Feb. 14, 2008

(30) Foreign Application Priority Data

Aug. 9, 2006  (DE) .......................... 10 2006 037 387
Aug. 10, 2006  (DE) .......................... 10 2006 037 599

(51) Int. Cl.
*H04N 7/00*    (2006.01)
(52) U.S. Cl. ...................... 250/208.1; 359/407; 359/363
(58) Field of Classification Search ............... 250/208.1; 359/407, 363
See application file for complete search history.

(56) References Cited

U.S. PATENT DOCUMENTS

| 6,067,190 A | 5/2000 | Kelly |
| 6,924,932 B2 * | 8/2005 | Nakajima ..................... 359/407 |
| 2004/0095471 A1 | 5/2004 | Heintz |

FOREIGN PATENT DOCUMENTS

| EP | 0 860 982 | 8/1998 |
| WO | WO 01/71407 | 9/2001 |

OTHER PUBLICATIONS

EPO Office Action, translation attached.
EPO Office Action, Apr. 9, 2010.
EPO Office Action, Dec. 27, 2007.

* cited by examiner

*Primary Examiner* — Seung C Sohn
(74) *Attorney, Agent, or Firm* — Walter Ottesen

(57) ABSTRACT

An optical viewing arrangement has an image recording function and each telescope tube thereof has a beam path through an objective and an ocular and has a sensor component assembly for outcoupling and converting a component light beam into digital data. A camera electronic component assembly (9) converts and compresses the digital image data of the sensor component assembly. The assembly (9) has a communications interface (10) for coacting with a communications interface (16) of an external remote-control unit (11) for digital data transmission. The interface (16) coacts with the interface (10) of the external optical viewing arrangement (1) for digital data transmission as well as a touch operator-controlled panel (15) for inputting and/or selecting operator-controlled functions, a microprocessor (24) for data processing incoming and outgoing data, a storage unit (17) for storing the digital data and a display (14).

38 Claims, 4 Drawing Sheets

OPTICAL VIEWING ARRANGEMENT, REMOTE-CONTROL UNIT AND VIEWING SYSTEM HAVING AN IMAGE RECORDING FUNCTION

CROSS REFERENCE TO RELATED APPLICATIONS

This application claims priority of German patent application nos. 10 2006 037 387.1 and 10 2006 037 599.8, filed Aug. 9, 2006 and Aug. 10, 2006, respectively, and the entire content of both applications is incorporated herein by reference.

BACKGROUND OF THE INVENTION

U.S. Pat. No. 6,067,190 discloses a binocular wherein the electronics are mounted in the binocular itself. The disadvantage here is the considerable amount of space needed especially for accommodating display, operator-controlled unit and storage cards. For this reason, the conventional design of a binocular with the movable folding bridge as well as a weight-optimized and space-optimized configuration cannot be maintained.

United States patent publication 2004/0095471 A1 discloses a binocular having a unit for outcoupling a component light beam. A module having an image sensor for converting images into digital data is so mounted on a housing of a tube that an outcoupling of an optical signal on the image sensor is possible. In addition, a completely autarkic digital camera is disclosed which is connected to the module mounted on the binocular. In order to be able to transmit sensor data from the binocular to the camera, such a camera additionally is provided with corresponding specific communication interfaces. Furthermore, the camera can be correspondingly modified for the purpose of the remote control of a sensor (specific transmission protocol for sensor data and control commands). The image recording is triggered from the camera while, at the same time, the binocular is held in the aligned position. The simultaneous operator control of two apparatus can lead to blurred images with an unsure user.

The entire content of United States patent publication 2004/0095471 A1 is incorporated herein by reference.

SUMMARY OF THE INVENTION

It is an object of the invention to provide an optical viewing arrangement, a remote-control unit and a viewing system having an image recording function. In this context, electronic components are provided in the optical viewing arrangement only to a limited extent. In this way, the slim and light form of a binocular or telescope can be maintained.

The optical viewing arrangement having an image recording function of the invention includes: at least one telescope tube having an objective and an ocular conjointly defining a beam path; a sensor component assembly assigned to the telescope tube for coupling out a component beam from the beam path and for converting the component beam into digital image data; a camera electronic component assembly for converting and compressing the digital image data; an ancillary communications interface; and, the camera electronic component assembly having a communications interface which is suitable for coacting with the ancillary communications interface for transmitting digital data.

An advantage of the invention is that a simple remote control is provided in lieu of a complete camera in accordance with United States patent publication 2004/0095471 A1. This remote control can be configured to be lighter and smaller than a complete camera because essential camera elements such as an image sensor and all optics, camera electronics (AD conversion, image pipe, sensor control, . . . ) can be omitted in the remote control.

Another advantage of the invention is that the essential camera electronics in a camera electronic component assembly is built into the optical viewing arrangement. With this relocation of the voluminous components such as display and operator-controlled panel into the remote control, the conventional binocular form can be retained or deviates only slightly therefrom. Accordingly, the folding bridge, inter alia, can be retained. In the viewing arrangement, one omits preferably the components which take up considerable structural space such as the display and operator-controlled panel.

In the viewing arrangement and remote control of the invention, image and/or video data are transferred from the optical viewing arrangement to the remote control. In addition, control data from the remote control are transferred to the optical viewing arrangement to control the camera electronic component assembly.

The division of a camera into a camera electronic component assembly in the optical viewing arrangement, on the one hand, and into a remote control, on the other hand, makes possible the data exchange while retaining standard formats and standard protocols. A wireless connection between viewing arrangement and remote control is possible because converted and compressed sensor data are transmitted. The sensor control and the sensor readout define disturbance sensitive real time processes. For this reason, a remote connection without a previous conversion and compression of the sensor data is subjected to disturbance.

A two-handed operator control of the optical viewing arrangement is easily possible. For triggering a recording, a triggering key can be actuated by the operator with this triggering key being disposed on the viewing arrangement. The setdown mobile unit (remote-control unit) is not needed for viewing and image recording and can be correspondingly kept on the belt or in a pocket of the user.

A further advantage of the invention is that the optical viewing arrangement can also be used without the separate camera unit. This is then a use as a purely visual viewing instrument.

The consumption of current of the electronics in the viewing arrangement can be reduced by the relocation of components with high current consumption into the remote-control unit so that a longer service duration results.

The remote control can be an independent apparatus, for example, in the form of an operator console and display console. The remote control can, however, also be a component of a further electronic apparatus especially a mobile end apparatus, for example, a hand computer (PDA, personal digital assistant), mobile telephone (cell phone) or a mobile computer (laptop, notebook). In the design or construction of a remote control in the electronic apparatus, already available displays, operator control panels and interfaces (especially communications interfaces) can be used.

In the optical viewing arrangement, a mechanical shutter can be provided as a closing device and for diaphragm adjustment. Furthermore, at least one optical element, for example, a lens, can be provided for adapting the image field to the size of the image sensor.

In an advantageous embodiment, the sensor component assembly of the viewing arrangement includes an image sensor and an image sensor interface. If, for example, a CCD-sensor is used, then the image sensor interface of the sensor component assembly coacts with an image sensor interface of the camera electronic component assembly for reading out data from the image sensor and for controlling the image sensor, for example, for a reset or start-to-end readout. In the case of a CMOS-sensor, the two image sensor interfaces are not needed. The CMOS-sensor can then coact directly with the microprocessor of the camera electronic component assembly.

In an advantageous embodiment, the viewing arrangement is configured with a triggering unit, especially a switch for triggering a recording of a photo or for triggering and ending a video sequence. The triggering unit cooperates here with the camera electronic component assembly.

The camera electronic component assembly includes a microprocessor in a preferred embodiment. This microprocessor makes possible a digital processing of transmitted data. For this purpose, a corresponding processing unit, that is, a DSP-unit (digital signal processing) can be provided. As a signal processing of read-out image data, a white balance or a sharpening of images or other preprocessing can be provided. In this context, an image pipe or an H3A engine can be used. The microprocessor has an internal or external memory/RAM. A further internal or external memory for the temporary storage of image data or video data can be assigned to the memory/RAM. The microprocessor makes possible the conversion and compression of image data or video data (raw data), which are read out from the image sensor, into a standard format, for example, JPEG, TIF, MPEG. In the microprocessor or in separate components, the standard format is then packed into a standard transmission protocol for transmission to the remote control. For example, wireless, USB or WLAN can be used as standard transmitting protocols.

The camera electronic component assembly is preferably integrated into the binocular housing. Here, the camera electronic component assembly is arranged so as to be protected against influences of weather and contamination.

It is understood that the optical viewing arrangement can preferably be telescopes, binoculars, spectives, target scopes and periscopes. Also, other especially magnifying viewing arrangements are conceivable.

The human-machine-interface (HMI control) can include the display as well as the touch operator-controlled unit (user interface). The display can also be configured as a touch-sensitive surface (touchpad). Display and operator-controlled panel serve for the input and/or selection of operator-controlled functions. On the display of the remote control, images and video sequences can be played and status data of a menu program can be displayed for information and/or selection. A menu software and its sequence are stored in the microprocessor of the remote control.

With the operator-controlled unit, for example, inputs for exposure time, white balance and other settings can be inputted and these can then read off on the display. The commands can be transmitted from the remote control via a transmission unit to the camera electronic component assembly.

In a preferred embodiment of the remote control, the memory unit is configured as a changeable storage medium, especially, a secure digital memory card. However, a hard disc can also be provided.

BRIEF DESCRIPTION OF THE DRAWINGS

The invention will now be described with reference to the drawings wherein.

DESCRIPTION OF THE PREFERRED EMBODIMENTS OF THE INVENTION

The modular system of the invention for viewing (binocular function) and the simultaneous digital image recording and image storage (camera function) is explained with respect to FIGS. 1 to 4.

Figure 1:
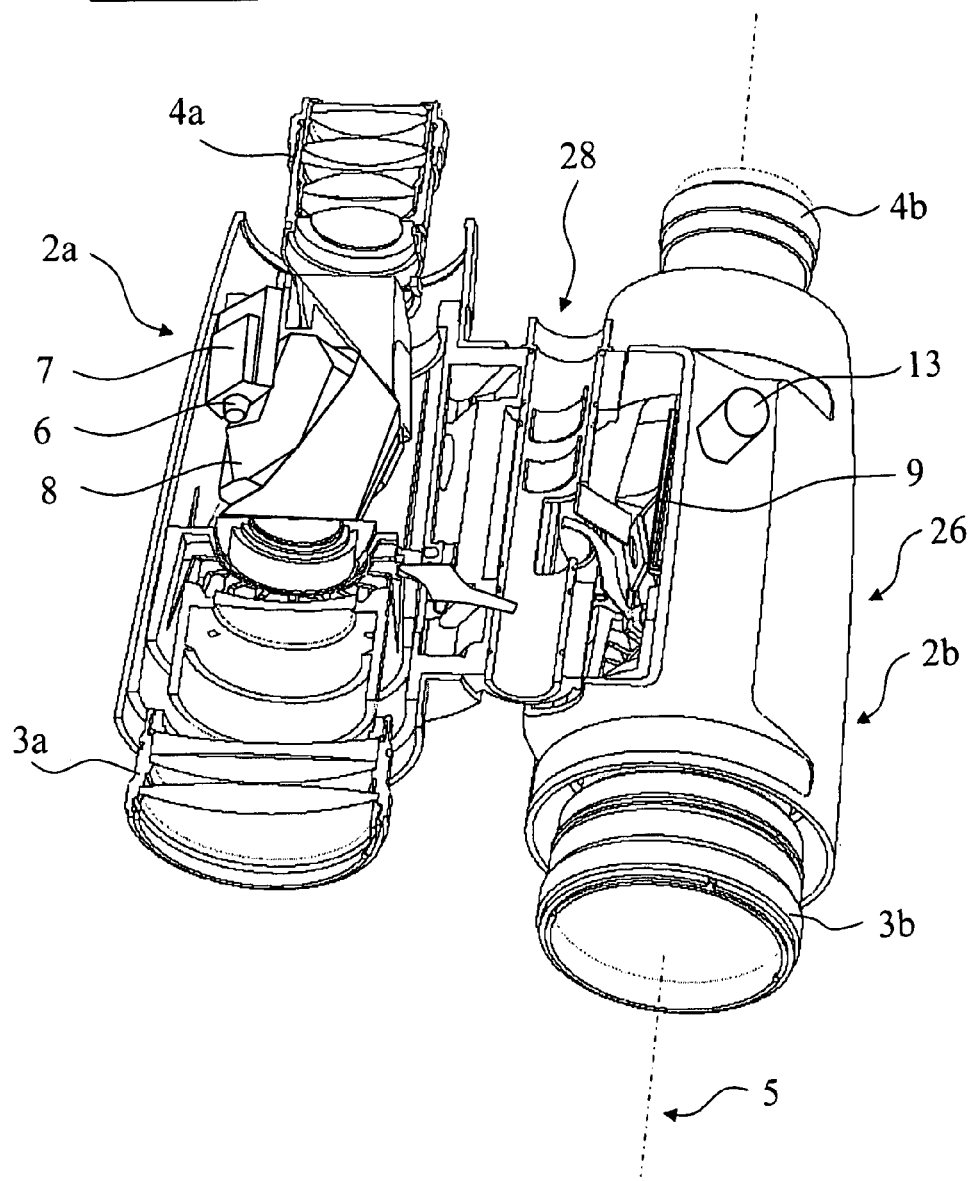
FIG. 1 is an embodiment of an optical viewing arrangement according to the invention.

FIG. 1 shows an optical viewing arrangement 1 of the invention in the form of a binocular having two telescope tubes 2a and 2b.

The binocular functions for viewing and contains, in addition, a camera electronic component assembly for recording, processing, compressing and transmitting digital image data.

The optical beam path can, in different ways, be divided into a visual channel and a digital channel. In FIG. 1, this takes place by outcoupling at a splitter layer applied to a prism 8. In this way, the beam path is branched and an image is projected onto an image sensor 6. However, an outcoupling is also possible via hinged mirrors. Furthermore, a separate objective in the binocular can be used for connecting to an image sensor.

The tubes 2a and 2b includes respective objectives 3a and 3b and respective oculars 4a and 4b. The optical axis 5 is shown for the right tube 2b. Each binocular tube 2a and 2b has a beam path (not shown) through its corresponding objective and ocular. In the left tube 2a, a sensor component assembly is shown having an image sensor 6 (here a CCD-sensor) and a CCD-control 7. A component beam is coupled out via a prism unit 8 to the image sensor 6. In order to obtain a sharp image, outcoupling preferably takes place in the region of an intermediate image plane. A camera electronic component assembly 9 is arranged in the right binocular tube 2a. This camera electronic component assembly 9 makes possible the drive and read out of the image sensor 6 as well as the image processing, image compression and storage in a memory (RAM).

Figure 2:
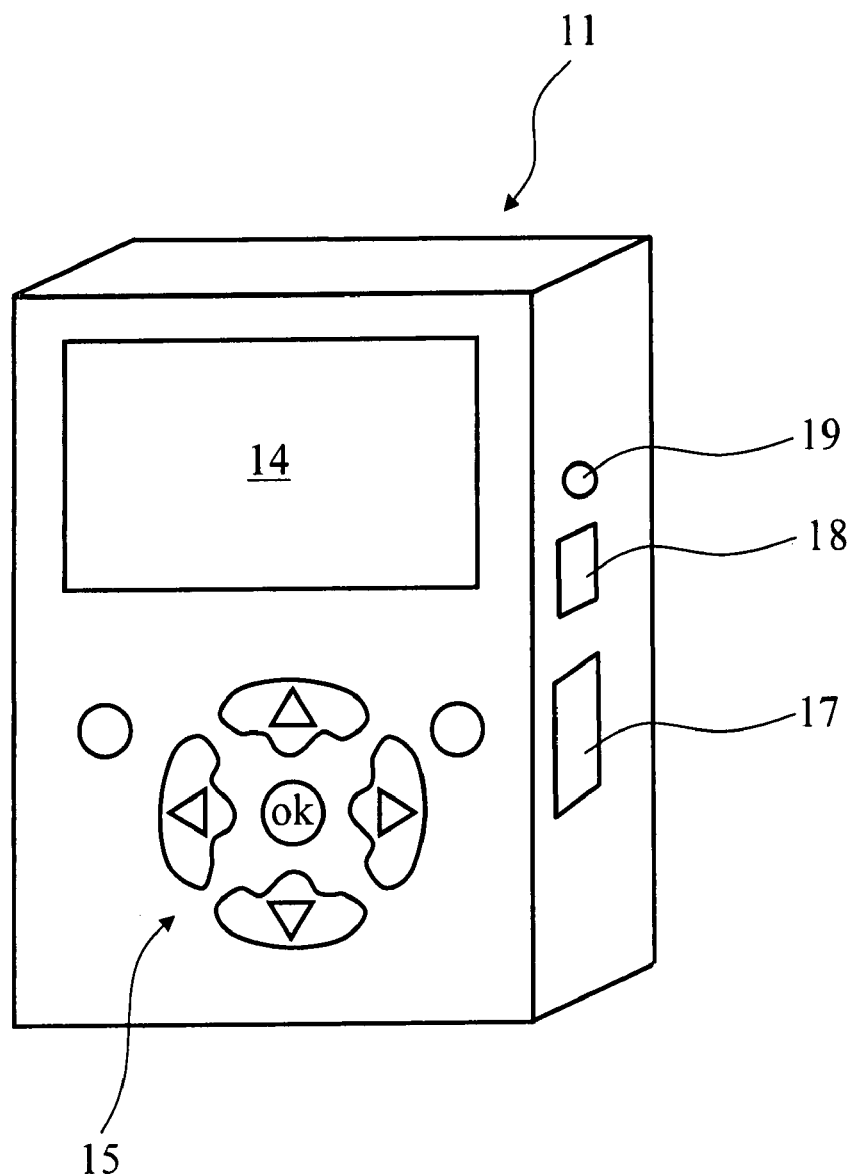
FIG. 2 is an embodiment of the remote-control unit of the invention.
Figure 3:
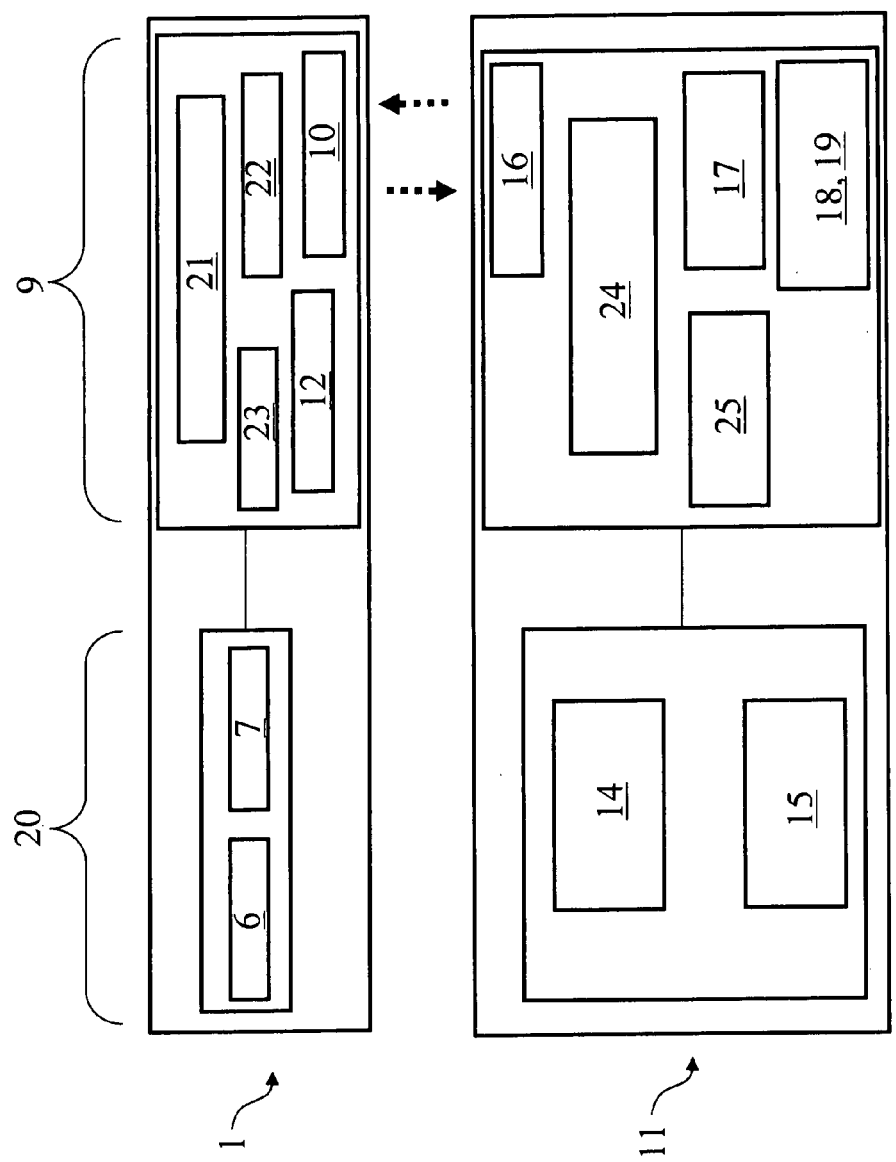
FIG. 3 is a schematic block diagram of the optical viewing arrangement and the remote control (viewing system); and, FIG. 4 is a further embodiment of the optical viewing arrangement of the invention.

This camera electronic component assembly further contains a communications interface 10 shown in FIG. 3 for a preferably wireless communication with a remote control 11 (FIG. 2) as well as a voltage supply 12 (FIG. 3). Also, a hardwired communication can be provided in lieu of a wireless communication.

With a triggering unit 13, the recording of an image or the start and the end of a video sequence can be triggered. This triggering unit is disposed on the outer housing of the binocular in the form of an operator-controlled key for triggering the image recording. After actuating the triggering key 13, the image is recorded on the image sensor 6 and is read out by the microprocessor 21 via the CCD-control 7. The image data are then processed (H3A engine) by the digital signal processor DSP and are compressed into a standard format (for example, JPEG). The file which now arises is automatically transmitted via the communication interface 10 via a connection which, as a rule, is wireless (for example, a wireless USB), to the remote control 11. The settings for the image recording such as exposure time, white balance, diaphragm selection are already transmitted in advance of an image recording from the remote control 11 via the wireless connection to the binocular 1.

A preferred embodiment of the mobile remote control 11 is shown schematically in FIG. 2.

The mobile remote-control unit 11 functions, on the one hand, as an operator-controlled console, storage console and display console for the camera function of the optical viewing arrangement 1, that is, image data and video data can be stored and/or shown on a display 14. The remote control can receive data, store data and further process data. On the other hand, the remote control 11 functions as a control unit for the camera function of the camera module in the binocular with the exception of the triggering of the image recording which is integrated into the binocular. However, a triggering of the image recording via the remote-control unit 11 can also be provided. All camera settings can be carried out via an operator-controlled panel 15 on the remote-control or mobile unit 11. The menu for a menu control of the camera function can be shown on the display 14 and the corresponding settings can be transferred via the communications interface 16 of the remote-control unit 11 (see FIG. 3) to the binocular 1.

The operator-controlled panel 15 is controlled via an HMI-control unit. Here, functions such as image selection, image display, thumbnail display, delete, ... as well as the settings of the camera such as adjusting image recording sequence, white balance, exposure time, et cetera can be undertaken.

The recorded, processed and compressed image data are automatically transferred from the binocular 1 to the mobile unit 11 for storage and/or display. For this purpose, the mobile unit 11 contains a memory 17 in addition to the communications interface 16. The memory 17 can, for example, be in the form of a secure digital storage card (SD card) for storing compressed image files. In addition, an external interface 18 can be provided for further transmission of image data (USB, video out, ... ). Furthermore, control electronics can be provided for the function modules including the voltage supply. Reference numeral 19 identifies a DC-voltage input.

The interaction of the optical viewing arrangement 1 and the mobile unit 11 is shown schematically in FIG. 3 based on a block diagram.

The upper portion 9 (FIG. 3) defines the viewing arrangement. In the left hand region, the sensor component assembly 20 is shown which includes a CCD-sensor 6 and a CCD-control 7 (CCD controller). The CCD-controller 7 functions for editing and transmitting sensor signals.

The camera electronic component assembly 9 includes a microprocessor 21 for digital signal processing. The microprocessor 21 can include a digital signal processor or be in connection with such a device. In addition, a memory 22 (SD-RAM) of a microprocessor is provided. The transmission of data from and to the sensor component assembly 20 takes place via a CCD interface 23. The sensor control 7 is unnecessary in the case of a CMOS-sensor.

The exchange of data with the remote-control unit 11 takes place via the communications interface 10 of the camera component assembly 9 and the communications interface 16 of the remote-control unit 11. The data exchange is indicated by the arrows.

The communications interface can be separate or be integrated into the microprocessor 21 and functions to receive compressed digital image data from the binocular and for the bidirectional communication of control data for the camera. The communications interface utilizes the particularly used communications protocol, wireless USB.

The lower block diagram (FIG. 3) shows the remote-control unit 11. The remote-control unit 11 further includes a microprocessor 24 for data processing as well as a voltage supply unit 25 for supplying the remote-control unit 11 with voltage. The microprocessor 24 functions for: the control of the external interface 18, memory administration, drive of the display 14 and the operator-control unit 15.

The memory 17 serves for storing the data transmitted from the camera electronic component assembly 9 to the remote-control unit 11.

For example, a universal serial bus (USB), a red-green-blue interface (RGB) as well as a DC-voltage input for the voltage supply (DC in) can be provided as the external additional interface 18.

Image data can be stored on a memory component (for example, SD card) and can be called up from there and shown on the display 14 or can be transmitted further via the external interface 18.

An integrated power supply makes available the battery supported supply voltage for the mobile remote control.

Figure 4:
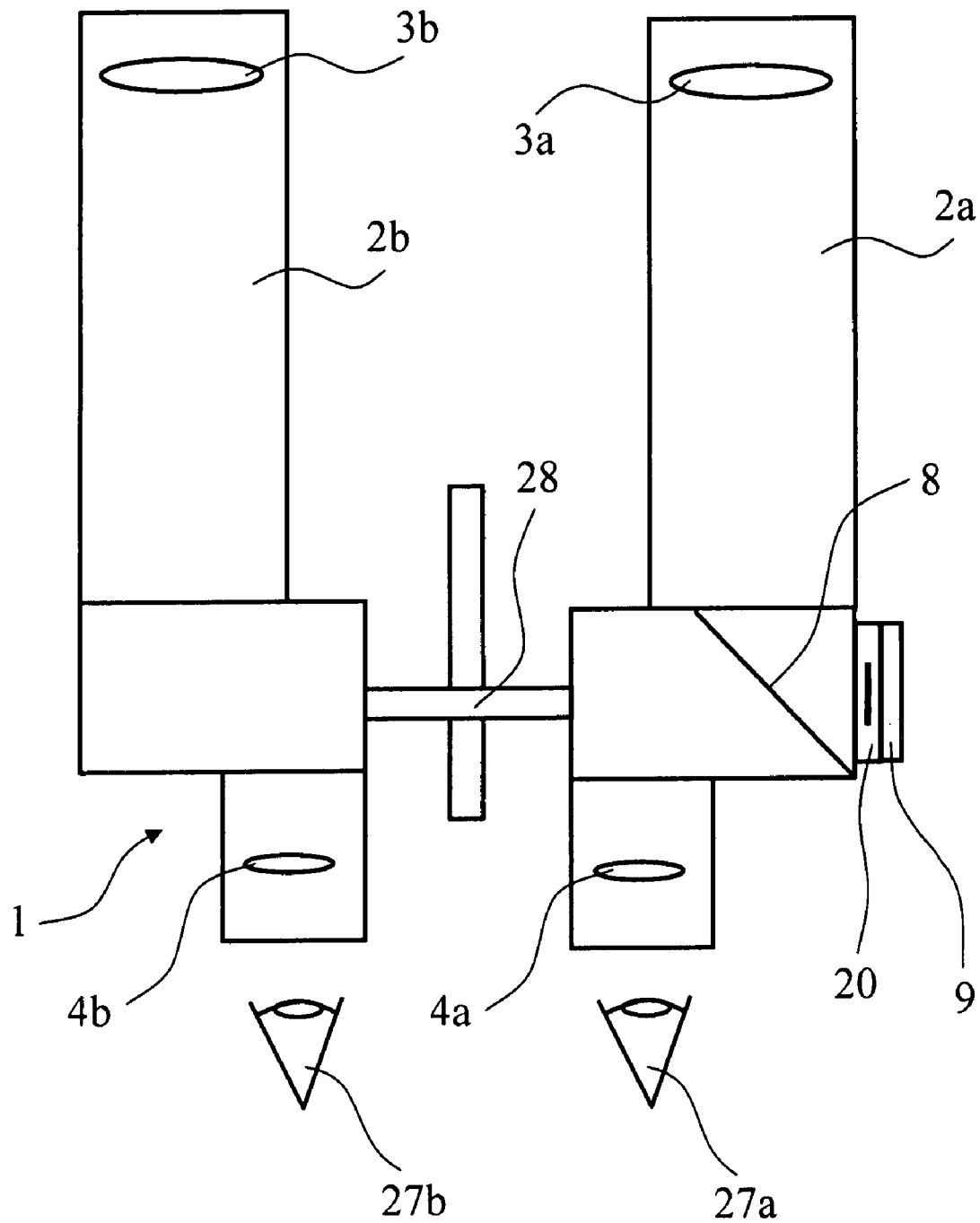

In FIG. 4, a further embodiment of the optical viewing arrangement of the invention is shown.

FIG. 4 shows a binocular 1 having two telescope tubes 2a and 2b having respective objectives 3a and 3b and respective oculars 4a and 4b. Reference numerals 27a and 27b identify the eyes of a user. The two tubes 2a and 2b are connected to each other via a folding bridge 28. A light beam (not shown) entering through the objective 3a runs through the tube 2a and is split at a beam splitter 8 into two component beams (not shown). A prism unit, a pivot mirror, a tilt mirror or other suitable devices for beam splitting can be used. The first component beam runs further through the ocular 4a to the left eye 27a of the user. The second component beam is deflected at the prism unit toward the sensor group 20. The camera electronic component assembly 9 is arranged next to the sensor assembly 20. The two assemblies 9 and 20 can, however, also be at a distance from each other as shown in FIG. 1. The two assemblies 9 and 20 take up only a small amount of space for accommodation. For this reason, this binocular can be encased by a conventional housing (not shown).

It is understood that the foregoing description is that of the preferred embodiments of the invention and that various changes and modifications may be made thereto without departing from the spirit and scope of the invention as defined in the appended claims.

REFERENCE NUMERAL LIST

1 Optical viewing arrangement, binocular
2a Left telescope tube
2b Right telescope tube
3a Left objective
3b Right objective
4a Left ocular
4b Right ocular
5 Optical axis
6 Image sensor
7 CCD-control
8 Prism unit
9 Camera electronic component assembly
10 Communications interface
11 Remote-control unit or mobile unit
12 Voltage supply
13 Triggering unit
14 Display
15 Operator-controlled panel
16 Communications interface
17 Memory
18 External interface
19 DC-voltage input
20 Sensor component assembly
21 Microprocessor
22 Memory/RAM
23 CCD interface 24 Microprocessor
25 Voltage supply unit
26 Housing
27a Left eye of a user
27b Right eye of a user
28 Folding bridge

What is claimed is:

1. An optical viewing arrangement having an image recording function, the optical viewing arrangement comprising:
   at least one telescope tube having an objective and an ocular conjointly defining a beam path;
   a sensor component assembly assigned to said telescope tube for coupling out a component beam from said beam path and for converting said component beam into digital image data;
   a camera electronic component assembly for converting and compressing said digital image data;
   said camera electronic component assembly having a first communications interface;
   a remote-control unit having a second communications interface; and,
   said first and communications interfaces coacting to transmit data bidirectionally between said remote-control unit and said camera electronic component assembly.

2. The optical viewing arrangement of claim 1, wherein said remote-control unit is an external remote-control unit.

3. The optical viewing arrangement of claim 1, wherein said sensor component assembly includes an image sensor.

4. The optical viewing arrangement of claim 3, wherein said sensor component assembly also includes an image sensor control.

5. The optical viewing arrangement of claim 3, wherein said image sensor is one of a CCD-sensor and a CMOS-sensor.

6. The optical viewing arrangement of claim 1, further comprising a triggering unit for triggering an image recordation or to start and stop a video recording; and, said triggering unit being connected to said camera electronic component assembly.

7. The optical viewing arrangement of claim 6, wherein said triggering unit is a switch.

8. The optical viewing arrangement of claim 4, wherein said camera electronic component assembly includes an image sensor interface suitable for coacting with said image sensor control of said sensor component assembly.

9. The optical viewing arrangement of claim 1, wherein said camera electronic component assembly includes a microprocessor for the digital signal processing of transmitted data.

10. The optical viewing arrangement of claim 9, wherein said camera electronic component assembly further includes a working memory assigned to said microprocessor.

11. The optical viewing arrangement of claim 9, wherein said microprocessor is configured for converting and compressing the image data to be transmitted.

12. The optical viewing arrangement of claim 1, wherein said camera electronic component assembly includes a voltage supply unit.

13. The optical viewing arrangement of claim 1, further comprising a housing; and, said camera electronic component assembly including being arranged at least partially within said housing.

14. The optical viewing arrangement of claim 13, wherein said camera electronic component assembly is fixedly or exchangeably arranged in said housing.

15. The optical viewing arrangement of claim 1, further comprising a housing; and, said camera electronic component assembly being arranged fixedly or exchangeably outside of said housing on said optical viewing arrangement.

16. The optical viewing arrangement of claim 1, wherein said optical viewing arrangement is one of the following: a binocular, telescope, spective or target scope.

17. A remote-control unit suitable for an optical viewing arrangement having an image recording function, the optical viewing arrangement including: at least one telescope tube having an objective and an ocular conjointly defining a beam path; a sensor component assembly assigned to said telescope tube for coupling out a component beam from said beam path and for converting said component beam into digital image data; a camera electronic component assembly for converting and compressing said digital image data; and, said camera electronic component assembly having a first communications interface; said remote-control unit comprising:
   a second communications interface suitable for coacting with said first communications interface of said optical viewing arrangement to digitally transmit data bidirectionally between said remote-control unit and said camera electronic component assembly;
   a touch operator-controlled device for inputting and/or selecting operator-controlled functions for transmission to said optical viewing arrangement via said first and second communications interfaces;
   a microprocessor for data processing incoming and outgoing data;
   a memory unit for storing the digital image data received from said camera electronic component assembly via said first and second communications interfaces; and,
   a display for displaying said digital image data.

18. The remote-control unit of claim 17, wherein the digital data displayed by said display includes digital image data and details as to input and/or selection of operator-controlled functions.

19. The remote-control unit of claim 17, further comprising at least one additional interface.

20. The remote-control unit of claim 19, wherein said additional interface is a USB interface and/or a video out interface for forwarding the image data to a suitable ancillary unit.

21. The remote-control unit of claim 17, further comprising a voltage supply unit.

22. The remote-control unit of claim 21, wherein said voltage supply unit is a controllable voltage supply unit.

23. The remote-control unit of claim 17, wherein said memory unit is configured as a hard disc store or a changeable memory.

24. A viewing system having an image-recording function, the viewing system comprising:
   an optical viewing arrangement including: at least one telescope tube having an objective and an ocular conjointly defining a beam path; a sensor component assembly assigned to said telescope tube for coupling out a component beam from said beam path and for converting said component beam into digital image data; a camera electronic component assembly for converting and compressing said digital image data; and, said camera electronic component assembly having a first communications interface; and,
   a remote-control unit for operating the image-recording function of said optical viewing arrangement;
   said remote-control unit including a second communications interface;

said first communications interface and said second communications interface coacting with each other for digitally transmitting data bidirectionally therebetween;

said remote-control unit further including: a touch operator-controlled device for inputting and/or selecting operator-controlled functions; a microprocessor for data processing incoming and outgoing data; a memory unit for storing the digital data; and, a display for displaying said digital data.

25. The viewing system of claim 24, wherein said first and second communications interfaces conjointly define a bidirectional wireless transmission path therebetween.

26. The optical viewing arrangement of claim 1, wherein said first and second communications interfaces conjointly define a bidirectional wireless transmission path therebetween.

27. The remote-control unit of claim 17, wherein said first and second communications interfaces conjointly define a bidirectional wireless transmission path therebetween.

28. A viewing system having an image-recording function, the viewing system comprising:

an optical viewing arrangement including: at least one telescope tube having an objective and an ocular conjointly defining a beam path; a sensor component assembly assigned to said telescope tube for coupling out a component beam from said beam path and for converting said component beam into digital image data; a camera electronic component assembly for converting and compressing said digital image data; and, said camera electronic component assembly having a first-communications interface; and, an external remote-control unit for operating the image-recording function of said optical viewing arrangement;

said external remote-control unit being spatially separated from said optical viewing arrangement and including a second communications interface;

said first communications interface and said second communications interface coacting with each other to define a bidirectional wireless transmission path between said optical viewing system and said remote-control unit;

said external remote-control unit further including: an operator-controlled device for selecting and/or inputting operator-controlled functions in the form of control data to said camera electronic component assembly via said bidirectional wireless transmission path; a microprocessor for data processing incoming and outgoing data; a memory unit for storing the digital image data received from said camera electronic component assembly via said bidirectional wireless transmission path; and, a display for displaying said digital data.

29. The viewing system of claim 28, wherein said control data transmitted to said camera electronic component assembly includes settings for image recording including exposure time and white balance.

30. The optical viewing arrangement of claim 1, wherein said sensor component assembly includes an image sensor for recording an image from said component beam; and, a CCD-control operatively connected to said image sensor; and, said camera electronic control assembly includes a microprocessor for reading out said image via said CCD-control as image data.

31. The optical viewing arrangement of claim 30, wherein said microprocessor includes a signal processor for processing and compressing said image data into a standard format defining a file.

32. The optical viewing arrangement of claim 31, wherein said standard format is JPEG.

33. The optical viewing arrangement of claim 31, wherein said file is automatically transmitted via said first communications interface to said remote-control unit.

34. The optical viewing arrangement of claim 33, wherein said first communications interface and said remote-control unit conjointly define a wireless connection therebetween.

35. The optical viewing arrangement of claim 34, wherein said wireless connection is a wireless USB connection.

36. The optical viewing arrangement of claim 30, wherein said sensor component assembly is mounted directly on said telescope tube and said camera electronic control assembly is mounted in close proximity to said sensor component assembly.

37. The optical viewing arrangement of claim 30, wherein said one telescope tube is a first telescope tube and said optical viewing arrangement includes a second telescope tube; said first and second telescope tubes conjointly define a binoculars; said sensor component assembly is mounted on said first telescope tube and said camera electronic control assembly is mounted on said second telescope tube in close proximity to said sensor component assembly.

38. The optical viewing arrangement of claim 37, wherein said microprocessor includes a signal processor for processing and compressing said image data into a standard format defining a file.

* * * * *